United States Patent
Oshima

(10) Patent No.: US 7,804,533 B2
(45) Date of Patent: Sep. 28, 2010

(54) IMAGE SENSING APPARATUS AND CORRECTION METHOD

(75) Inventor: Koji Oshima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 936 days.

(21) Appl. No.: 11/614,402

(22) Filed: Dec. 21, 2006

(65) Prior Publication Data
US 2007/0146508 A1    Jun. 28, 2007

(30) Foreign Application Priority Data
Dec. 26, 2005    (JP) .............................. 2005-373521

(51) Int. Cl.
*H04N 9/64* (2006.01)
(52) U.S. Cl. ...................... 348/246; 348/243
(58) Field of Classification Search ................. 348/241, 348/243, 246–7
See application file for complete search history.

(56) References Cited

U.S. PATENT DOCUMENTS

| | | | | |
|---|---|---|---|---|
| 6,101,287 | A * | 8/2000 | Corum et al. ................ | 382/274 |
| 6,529,622 | B1 * | 3/2003 | Pourjavid .................... | 382/149 |
| 6,747,697 | B1 * | 6/2004 | Lin et al. ..................... | 348/246 |
| 7,355,638 | B2 | 4/2008 | Mori | |
| 2003/0025813 | A1 * | 2/2003 | Yoshiwara et al. .......... | 348/246 |
| 2005/0073596 | A1 * | 4/2005 | Takahashi ................... | 348/241 |

FOREIGN PATENT DOCUMENTS

| | | |
|---|---|---|
| JP | H08-065506 | 3/1996 |
| JP | 2003-018475 | 1/2003 |
| JP | 2003-333435 | 11/2003 |
| JP | 2004-005424 | 1/2004 |
| JP | 2004-248006 A | 9/2004 |
| JP | 2005-057691 A | 3/2005 |
| JP | 2005-094338 A | 4/2005 |
| JP | 2005-176061 A | 6/2005 |

OTHER PUBLICATIONS

English Abstract of JP2004-005424 published Jan. 8, 2004.*
Japanese Office Action issued on Feb. 16, 2009 for Japanese Patent Application No. 2005-373521 (No English translation provided).

* cited by examiner

*Primary Examiner*—Sinh Tran
*Assistant Examiner*—Daniel M Pasiewicz
(74) *Attorney, Agent, or Firm*—Canon USA Inc IP Division

(57) ABSTRACT

An image sensing apparatus includes an image sensing device having a plurality of pixels, a smoothing unit that smoothes a dark image signal acquired with the image sensing device shielded from light; a subtraction unit that subtracts a second dark image signal from the dark image signal; an extraction unit that extracts, as a defective pixel of the image sensing device, a pixel of which an obtained difference is outside a preset range; and a correction unit that corrects, out of subject image signals output from the image sensing device, an image signal of the defective pixel extracted by the extracting unit, using an image signal of a pixel peripheral to the defective pixel.

14 Claims, 8 Drawing Sheets

FIG. 2

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |

FIG. 3

|  | x | x+1 | x+2 | x+3 | x+4 |
|---|---|---|---|---|---|
| y | 3 | 3 | 3 | 4 | 4 |
| y+1 | 4 | 4 | 3 | 3 | 3 |
| y+2 | 2 | 2 | 9 | 3 | 3 |
| y+3 | 3 | 3 | 3 | 2 | 2 |
| y+4 | 4 | 4 | 3 | 3 | 3 |

IMAGE SENSING APPARATUS AND CORRECTION METHOD

BACKGROUND OF THE INVENTION

1. Field of the Invention

The present invention relates to an image sensing apparatus and a correction method, and more specifically to a technique for correcting the output of an image sensing device used in an image sensing apparatus.

2. Description of the Related Art

Conventionally, solid state image sensing devices such as CCD and CMOS sensors are generally used in digital cameras, video cameras, and other image sensing apparatuses. With these solid state image sensing devices, it is known that defective pixels occurring in the manufacturing process are one cause of a decreased image quality and decreased manufacturing yield. Given the difficulty in completely eliminating defective pixels, it is generally known that improvement in image quality can be achieved by interpolation using pixels around the defective pixel.

A known method for correcting signals output from defective pixels is disclosed in the Background Art of JP 2003-333435A, for example. Firstly, defective pixels are assessed, for example, when the solid state image sensing device is shipped from the factory, using output values obtained by exposing the solid state image sensing device for a standard charge accumulation period under prescribed conditions. Information acquired at this time showing the position and output levels of defective pixels is stored, and when image sensing is performed, the output of the defective pixels is interpolated using the output level of pixels adjacent to the defective pixels based on the stored position information and output level information.

On the other hand, dark current is known to occur with solid state image sensing devices due to factors such as temperature. The dark current changes depending on use environment and exposure period. For this reason, a known technique involves performing an image sensing operation with the image sensing device shielded from light immediately before or after the actual image sensing operation, and subtracting the sensed image obtained at this time (dark or black image) from the image taken of the subject (e.g., see Background Art of JP 2003-333435A). Subtracting a dark image from the subject image in this way reduces the effects caused by the fixed pattern noise of the dark current component and minute defective pixels, and allows improvement in image quality to be achieved.

A technique is also disclosed that involves determining noise conditions by comparing the output value of a dark image or the result of subtracting a dark image with a prescribed threshold value for each pixel, and performing correction after switching between subtraction and replacement of the dark image according to those conditions (e.g., see JP 2004-5424A). This technique makes it possible to reduce noise, by performing replacement, of even pixels approaching a saturation level at which correction by subtraction is difficult, and, moreover, to realize correction that redresses the problem of noise being newly superimposed as a result of the subtraction.

Further, a method is also disclosed in which a gain is applied to fixed pattern noise extracted from dark images and stored when a solid state image sensing device is manufactured so that the fixed pattern noise is made responsive to changes in temperature detected by a temperature sensor in the image sensing apparatus (e.g., see JP 2003-18475A). This method allows the effects caused by temperature-dependent fixed pattern noise to be removed by adding or subtracting fixed pattern noise to which a gain that depends on temperature change has been applied to correct an image taken of a subject.

A technique is also disclosed that involves correcting black levels in which the random component of dark images has been reduced, using data obtained by capturing and averaging dark image output data multiple times (e.g., see JP H8-65506A).

With the correction by subtracting dark images disclosed in JP 2003-333435A, effects caused by fixed pattern noise and two-dimensional dark current unevenness on the screen can be reduced. However, because this is merely subtraction involving sensed images and black images, noise due to the random component of both images is added, which may conversely prevent improvements in image quality.

In the case of the replacement of defective pixels as disclosed in JP 2004-5424A, the effects caused by the dark current component, which changes depending on temperature and exposure period, cannot be reduced. With the method disclosed in JP 2004-5424A, pixels that exceed a prescribed threshold value are replaced, having been judged to have excess noise. However, in the case where this threshold value is set based on the result of subtracting dark images from sensed images, noise cannot be accurately judged if luminance varies greatly in the sensed image. When sensing a starry sky or fireworks, for example, high brightness stars and fireworks may possibly disappear due to replacement processing.

Also, in the case where the dark current component has increased in a portion that includes a plurality of pixels due to the effects of peripheral circuitry or heat emitted from the image sensing device itself, appropriate processing cannot be carried out even if replacement is performed based on a threshold judgment. This is because with areas in which dark current has partially increased there will also be an increase in dark current around the periphery of the pixels to be replaced.

The method disclosed in JP 2003-18475 seeks to remove the effects caused by temperature change in the image sensing apparatus. However, since it is not the temperature of the actual image sensing device that is detected, and the temperature distribution of the image sensing device is not always uniform, correction cannot be performed with high precision.

Also, with the method disclosed in JP H8-65506, an excess amount of time is required to capture images multiple times. User operability is thus impaired due to the release interval being affected in image sensing apparatuses such as cameras.

SUMMARY OF THE INVENTION

The present invention has been made in consideration of the above situation, and has as its object to reduce the effects on an image caused by defective pixels in an image sensing device and variation in the dark current component, without adding new noise, in an image sensing apparatus.

According to the present invention, the forgoing object is attained by providing an image sensing apparatus comprising:

an image sensing device that has a plurality of pixels;

a smoothing unit that smoothes a first dark image signal acquired with the image sensing device shielded from light and generates a second dark image signal;

a subtraction unit that subtracts the second dark image signal from the first dark image signal;

an extraction unit that extracts, as a defective pixel of the image sensing device, a pixel of which an obtained difference is outside a preset range; and a correction unit that corrects, out of subject image signals output from the image sensing device, an image signal of the defective pixel extracted by the extracting unit, using an image signal of a pixel peripheral to the defective pixel.

According to the present invention, the forgoing object is also attained by providing an image sensing apparatus comprising:

an image sensing device that has a plurality of pixels;

an operation unit that suppresses shading of dark image signals acquired with the image sensing device shielded from light;

an extraction unit that extracts, as a defective pixel of the image sensing device, a pixel whose suppressed dark image signal is outside a preset range from the dark image signals whose shading has been suppressed; and a correction unit that corrects, out of subject image signals output from the image sensing device, an image signal of the defective pixel extracted by the extracting unit, using an image signal of a pixel peripheral to the defective pixel.

Further features of the present invention will become apparent from the following description of exemplary embodiments (with reference to the attached drawings).

BRIEF DESCRIPTION OF THE DRAWINGS

FIG. 2 shows a Bayer array.

FIG. 3 illustrates exemplary median filtering according to the embodiment of the present invention.

DESCRIPTION OF THE EMBODIMENTS

Preferred embodiments of the present invention will be described in detail in accordance with the accompanying drawings.

Figure 1:
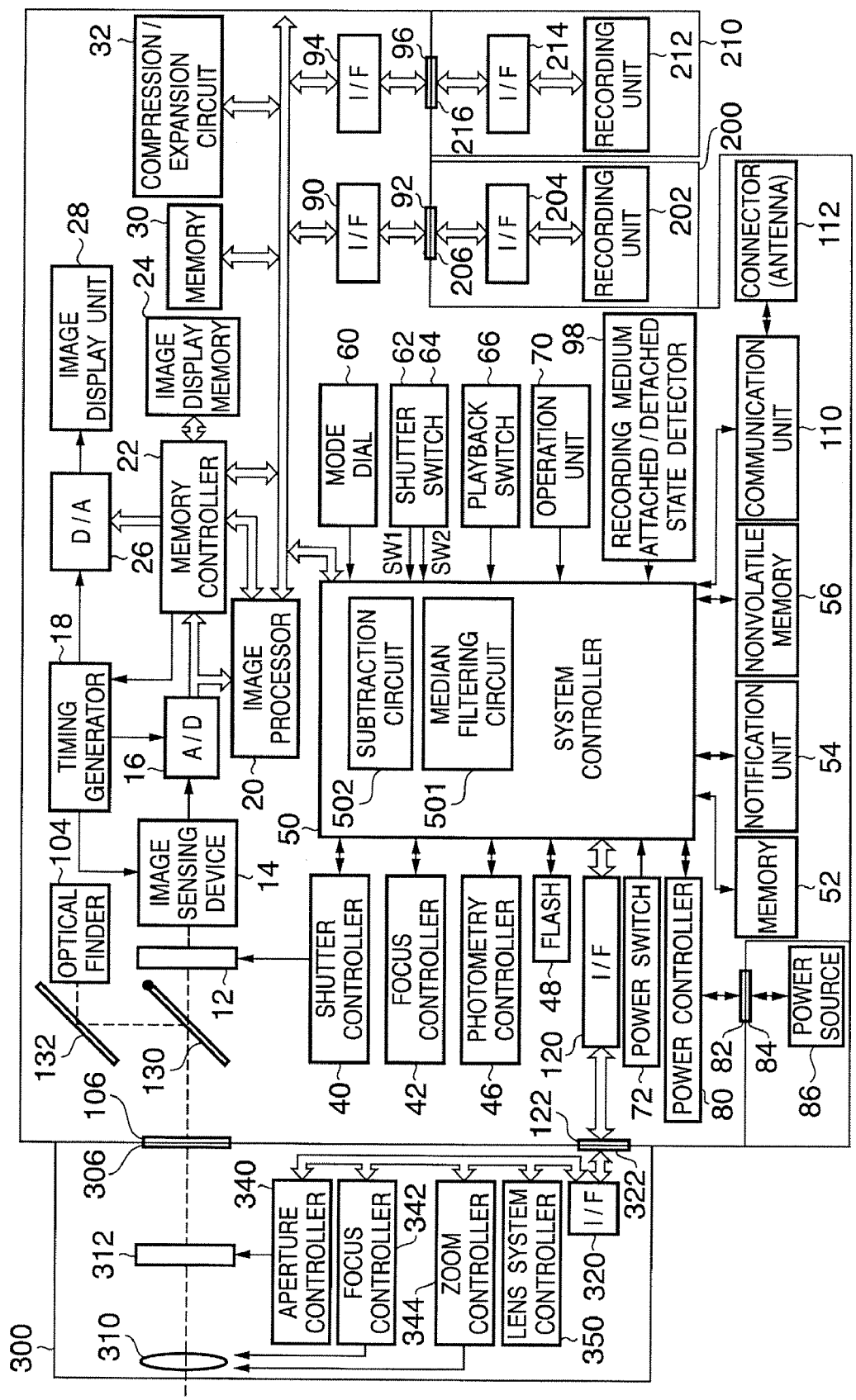
FIG. 1 is a block diagram showing the configuration of an image sensing apparatus according to an embodiment of the present invention.

FIG. 1 is a block diagram showing the configuration of an image sensing apparatus having an image processing function in an embodiment of the present invention. The present embodiment is described taking a digital camera as an example of an image sensing apparatus. Note that the image sensing apparatus may be a digital video camera, a mobile terminal with camera (including a mobile telephone with camera), a scanner or the like, and that application of the present invention is possible provided the apparatus is capable of converting a subject optical image and outputting an electrical image signal.

As shown in FIG. 1, the image sensing apparatus of the present embodiment is configured primarily by a camera body 100 and an interchangeable lens unit 300.

In the lens unit 300, 310 is an image sensing lens composed of a plurality of lens, 312 is an aperture, and 306 is a lens mount that mechanically joins the lens unit 300 to the camera body 100. The lens mount 306 includes various functions for electrically connecting the lens unit 300 to the camera body 100. 320 is an interface for connecting the lens unit 300 to the camera body 100 in the lens mount 306, while 322 is a connector that electrically connects the lens unit 300 to the camera body 100.

The connector 322 is also provided with the function of being supplied with or supplying various power sources, as well as exchanging control signals, status signals and data signals between the camera body 100 and the lens unit 300. Also, the connector 322 may be configured to perform not only telecommunications but optical communications, audio communication and the like.

340 is an aperture controller that controls the aperture 312 in coordination with a shutter controller 40 for controlling a shutter 12 of the camera body 100 (described later), based on photometric information from a photometry controller 46. 342 is a focus controller that controls the focusing of the image sensing lens 310, while 344 is a zoom controller that controls the zooming of the image sensing lens 310.

350 is a lens system controller that controls the overall lens unit 300. The lens system controller 350 is provided with a memory for storing constants, variables, programs and the like for use in operations. Further, the lens system controller 350 is also provided with a nonvolatile memory for storing, for example, identification information such as a number unique to the lens unit 300, management information, function information such as maximum and minimum aperture values and the focal length, and current and past setting values.

The configuration of the camera body 100 is described next.

106 is a lens mount for mechanically joining the camera body 100 and the lens unit 300, while 130 and 132 are mirrors that direct light beams incident on the image sensing lens 310 to an optical finder 104 using a single-lens reflex (SLR) system. Note that the mirror 130 may be either a quick-return mirror or a half mirror. 12 is a shutter, while 14 is an image sensing device that converts optical images to electrical signals. In the present embodiment, a Bayer-array CMOS area sensor in which pixels are two-dimensionally arrayed as shown in FIG. 2 is used as the image sensing device 14. Light beams incident on the image sensing lens 310 are directed via the aperture 312, the lens mounts 306 and 106, the mirror 130 and the shutter 12, which are light intensity control unit, using an SLR system, and imaged on the image sensing device 14 as an optical image.

Numeral 16 denotes an A/D converter which converts an analog signal output from the image sensing device 14 into a digital signal; 18, a timing generator which supplies a clock signal and a control signal respectively to the image sensing device 14, the A/D converter 16 and a D/A converter 26, under the control of a memory controller 22 and a system controller 50.

Numeral 20 denotes an image processor which performs predetermined pixel interpolation processing, color conversion processing and the like on image data from the A/D converter 16 or image data from the memory controller 22. The image processor 20 performs predetermined calculation processing using the image data outputted from the A/D converter 16, and the system controller 50 performs through-the-lens (TTL) auto focus (AF) processing, auto exposure (AE) processing, pre-flash (EF) processing with respect to a shutter controller 40 and a focus controller 42, based on the result of calculations. Further, the image processor 20 performs predetermined calculation using the image data outputted from the A/D converter 16, and performs TTL auto white balance (AWB) processing, based on the result of calculations. The image processor 20 also corrects image data of defective pixels based on defect correction data stored in non-volatile memory 56 and/or defect correction data generated by sensing a dark image.

It should be noted that in the configuration as shown in FIG. 1, since the focus controller 42 and the photometry controller 46 are provided, the system controller 50 may perform AF, AE and EF processes using the focus controller 42 and the photometry controller 46, and not performed using the image processor 20. Alternatively, AF, AE and EF processes may be performed using the focus controller 42 and the photometry controller 46, and further performed using the image processor 20.

The memory controller 22 controls the A/D converter 16, the timing generator 18, the image processor 20, an image display memory 24, the D/A converter 26, a memory 30 and a compression/expansion circuit 32. The image data outputted from the A/D converter 16 is written into the image display memory 24 or the memory 30 via the image processor 20 and the memory controller 22, or only via the memory controller 22.

Numeral 24 denotes an image display memory; 26, the D/A converter; and 28, an image display unit comprising a TFT LCD (Liquid Crystal Display) or the like. Image data written into the image display memory 24 is displayed on the image display unit 28 via the D/A converter 26. An electronic view finder (EVF) function is realized by sequentially displaying obtained images on the image display unit 28. Further, the image display unit 28 arbitrarily turns ON/OFF its display in accordance with an instruction from the system controller 50. If the display is turned OFF, the electric consumption of the camera body 100 can be greatly reduced.

The memory 30, used for storing obtained still images and moving images, has a sufficient storage capacity for storing a predetermined number of still images and a moving image for a predetermined period. In sequential image sensing to sequentially obtain a plural number of still images or panoramic images, a large amount of image data can be written into the memory 30 at a high speed. Further, the memory 30 may be used as a work area for the system controller 50.

The compression/expansion circuit 32 compresses or expands image data using a known compression method, such as adaptive discrete cosine transformation (ADCT). The compression/expansion circuit 32 reads image data stored in the memory 30 and performs compression or expansion processing on the read image data, and writes the processed data into the memory 30.

The shutter controller 40 controls the shutter 12 having the diaphragm function in cooperation with the aperture controller 340, which controls the aperture 312, on the basis of photometric information from the photometry controller 46. The focus controller 42 is for performing AF process. The focus controller 42 measures the focused state of an optical image formed of light flux which entered the image sensing lens 310 of the lens unit 300 and passed through the aperture 312, the lens mounts 306 and 106, the mirror 130, and sub-mirror for focusing (not shown) using the SLR system.

The photometry controller 46 is for performing AE process. The photometry controller 46 measures the exposure state of an optical image formed of light flux which entered the image sensing lens 310 of the lens unit 300 and passed through the aperture 312, the lens mounts 306 and 106, the mirror 130, and sub-mirror for photometry (not shown) using the SLR system. The flash 48 has an AF auxiliary light projection function and a flash adjusting function. The photometry controller 46 is interlocked with the flush 48 to realize the EF function. Further, the photometry controller 46 of this embodiment controls to perform a known multi-point photometry on a plurality of photometry areas. More specifically, the photometry controller 46 controls to perform photometry on a plurality of points (e.g., 35 points) in a sensed seen, and determines exposure values based on the result of photometry.

Alternatively, AE and AF control may be performed in accordance with the result of calculations by the image processor 20 based on the image data from the A/D converter 16. In that case, the system controller 50 can control the shutter controller 40, the aperture controller 340, and the focus controller 342 to perform AE and AF control using a video TTL method.

Further, the AF control may be performed in accordance with a result of measurement by the focus controller 42 and the result of calculations by the image processor 20 based on the image data from the A/D converter 16. Furthermore, the AE control may be performed in accordance with a result of photometry by the photometry controller 46 and in accordance with the result of calculations by the image processor 20 based on the image data from the A/D converter 16.

The system controller 50 controls the overall camera body 100 and incorporates a known CPU, for instance. The system controller 50 further comprises a median filtering circuit 501 to perform median-filtering and a subtraction circuit 502 to perform subtraction process with regard to image data and the like. Memory 52 stores the constants, variables, and programs for operation of the system controller 50.

Numeral 54 denotes a notification unit which notifies operating statuses, messages and the like to the outside by using characters, images, sound and the like, in correspondence with execution of program by the system controller 50. The notification unit 54 comprises one or more combinations of display devices including an LCD and an LED for visual notification and sound generating devices for audio notification. Especially, the display device or devices is/are provided in a single or plural visually-recognizable positions around an operation unit 70 of the camera body 100. Further, a part of functions of the notification unit 54 is provided within an optical finder 104.

The display contents of the notification unit 54, displayed on the LCD or the like, include indication relating to an image sensing mode, such as single shot/sequential image sensing, and a self timer. The display contents also include indication relating to recording, such as a compression rate, the number of recording pixels, the number of recorded images, and the number of recordable images. Further, the display contents also include indication relating to image sensing conditions, such as a shutter speed, an f number (aperture), exposure compensation, flash illumination, and red-eye reduction. Other than the above, the display contents also include indication of macro image sensing, a buzzer-set state, a timer battery level, a battery level, an error state, information of plural digit numbers, attached/detached status of recording media 200 and 210, operation of communication I/F, date and time, connection conditions with external computers, and settings of dark correction.

Further, the display contents of the notification unit 54, displayed within the optical finder 104, include indication of a focus state, an image sensing ready state, a camera shake warning, a flash charge state, a flash ready state, the shutter speed, the f number (aperture), the exposure compensation, and a writing state to a recording medium.

Furthermore, the display contents of the notification unit 54, displayed on the LCD or the like, include indication of a focus state, an image sensing ready state, a camera shake warning, a flash charge state, a flash ready state, a writing state to a recording medium, a macro image sensing settings, and secondary battery charge state.

Further, the display contents of the notification unit 54, displayed by a lamp or the like, include indication of self-timer or the like. The lamp used for indication of self timer may be also used as an AF auxiliary light.

Numeral 56 denotes an electrically erasable and recordable nonvolatile memory, such as an EEPROM, on which programs (to be described later) is stored. The nonvolatile memory 56 stores setting values such as a variety of parameters and ISO sensitivity, as well as correction data relating to defective pixels, such as position information of the defective pixels, the correction data being used upon correcting output data from the defective pixels.

Stored as the above-described correction data is the correction data corresponding to respective sensors checked and send by a factory manufacturing a CMOS area sensor according to this embodiment. However, the correction data of the present invention is not limited to this, and information relating to defective pixels may be created and stored after setting the CMOS area sensor in the camera.

Numerals 60, 62, 64 and 70 denote operation means for inputting various operation instructions to the system controller 50, comprising a single or plurality of combinations of switches, dials, touch panels, a device for pointing by line-of-sight detection, a voice recognition device, and the like.

The operation means will be described in more detail.

Numeral 60 denotes a mode dial switch for selecting various image sensing modes, such as an automatic image sensing mode, a programmed image sensing mode, a shutter-speed-priority image sensing mode, an aperture-priority image sensing mode, a manual image sensing mode, a depth-priority image sensing mode, a portrait image sensing mode, a landscape image sensing mode, a close-up image sensing mode, a sport image sensing mode, a night view image sensing mode, and a panoramic image sensing mode.

Numeral 62 denotes a shutter switch SW1 turned ON by half stroke of a shutter button (not shown), to instruct start of the operations of the AF processing, the AE processing, the AWB processing, the EF processing and the like.

Numeral 64 denotes a shutter switch SW2 turned ON by full stroke of the shutter button (not shown), to instruct start of a series of operations of exposure processing, development processing and recording processing. In the exposure processing, a signal read from the image sensing device 14 is written into the memory 30, via the A/D converter 16 and the memory controller 22. Then the development processing is performed using calculations by the image processor 20 and the memory controller 22. In the recording processing, the image data is read from the memory 30 and compressed by the compression/expansion circuit 32, and the compressed image data is written into the recording medium 200 or 210.

An image display ON/OFF switch 66 can set ON/OFF of the image display unit 28. With this function, in image sensing using the optical finder 104, power supply to the image display unit 28 comprising an LCD or the like can be cut to save the power.

A playback switch 66 is to instruct start of playback operation of reading image data sensed in the image sensing mode from the memory 30 or the recording medium 200 or 210, and displaying the read image data on the image display unit 28. Further, the playback switch 66 may be configured to set various function modes, such as a playback mode, a multi-image playback/deletion mode, and a PC connection mode.

Numeral 70 denotes an operation unit comprising various buttons and touch panels including a menu button, a set button, a macro button, a multi-image playback/repaging button, a single-shot/sequential/self-timer image sensing selection button, a forward (+) menu item selection button, a backward (−) menu item selection button, a forward (+) playback image search button, a backward (−) playback image search button, an image sensing quality selection button, an exposure correction button, and a date/time set button. The forward (+) and backward (−) selection buttons may be configured as a dial switch, which may facilitate selection of numbers and functions. Further, the operation unit 70 further comprises an ISO sensitivity setting button for setting ISO sensitivity by changing a gain used in the image sensing device 14 or the image processor 20.

The operation unit 70 yet further comprises a selection/changeover button for selecting and changing over a various functions upon executing image sensing and playback in, e.g. the panoramic mode, and a set/execution button for setting and executing the various functions upon executing image sensing and playback in, e.g. the panoramic mode. The operation unit 70 further comprises: an image display ON/OFF switch for setting the ON/OFF state of the image display unit 28; a quick review ON/OFF switch for setting a quick review function for automatically reproducing sensed image data immediately after image sensing; a compression mode switch for selecting a compression ratio for, e.g., JPEG compression or a CCDRAW mode in which output signals from the image sensing device 14 are simply digitized and recorded on a recording medium; and a AF mode setting switch for setting a one-shot AF mode and servo AF mode. In the one-shot AF mode, when the shutter switch SW1 (62) is depressed, AF operation is started, and once in-focus state is attained, the in-focus state is maintained. In the servo AF mode, AF operation is continuously performed during the shutter switch SW1 (62) is depressed. The operation unit 70 further comprises a dark subtraction mode setting button for setting a dark subtraction processing mode for sensing a dark image in a light-shielded state by closing the shutter 12 after sensing an object, and subtracting the dark image from an object image.

Numeral 72 denotes a power switch capable of switching between ON/OFF of the camera body 100. The power switch 72 can also set ON/OFF of peripheral devices, connected to the camera body, such as the lens unit 300, external flash, the recording media 200 and 210, and the like.

Numeral 80 denotes a power controller comprising a battery detection circuit, a DC-DC converter, a switch circuit to select the block to be energized and the like. The power controller 80 detects the attached/detached state of the battery, the battery type and the remaining battery power level, controls the DC-DC converter based on the results of detection and an instruction from the system controller 50, and supplies a necessary voltage to the respective parts including the recording medium for the necessary period.

Numerals 82 and 84 denote connectors; and 86, the power source comprising a primary battery such as an alkaline battery or a lithium battery, a secondary battery such as an NiDd battery, an NiMH battery, an Li-ion battery, or an Li polymer battery, an AC adapter, or the like.

Numerals 90 and 94 denote interfaces for recording media such as a memory card or a hard disk; and 92 and 96, connectors for connection with the recording media such as a memory card or a hard disk. A recording medium attached/ detached state detector 98 detects whether recording medium 200 and/or 210 is attached to the connector 92 and/or connector 96.

In the present embodiment, two systems of interfaces and connectors for connection with the recording media are employed. However, the number of systems is not limited, and a single or plurality of systems of interfaces and connectors may be provided. Further, interfaces and connectors pursuant to different standards may be combined.

As the interfaces and connectors, those in conformity with Personal Computer Memory Card International Association standards (PCMCIA cards) and those in conformity with compact flash (CF) (registered trademark) card standards may be used.

In a case where interfaces and connectors in conformity with the PCMCIA standards, CF card standards and the like are used as the interfaces 90 and 94 and the connectors 92 and 96, image data and management information attached to the image data are transmitted/received with respect to other peripheral devices such as a computer and a printer by connection with various communication cards such as a LAN card, a modem card, a Universal Serial Bus (USB) card, an IEEE (Institute of Electrical and Electronic Engineers) 1394 card, a P1284 card, an SCSI (Small Computer System Interface) card and a PHS card.

The optical finder 104 can provides for a user an optical image formed by light beams which entered from the image sensing lens 310 and are directed via the aperture 312, the lens mounts 306 and 106, the mirrors 132 and 132 using the SLR system. Thereby, the optical finder 104 can be used for image sensing without the electronic view finder function by the image display unit 28. In the optical finder 104, realized are some of the functions of the notification unit 54 including the indication of focus state, the camera shake warning, the flash charge state, the shutter speed, the f number (aperture), the exposure compensation and the like.

A communication unit 110 has various communication functions for RS232C, USB, IEEE 1394, P1284, SCSI, modem, LAN, and wireless communication. A connector/antenna 112 functions as a connector when the camera body 100 is connected to another device via the communication unit 110, and as an antenna for wireless communication. An interface 120 connects the camera body 100 to the lens unit 300 at the lens mount 106.

A connector 122 electrically connects the camera body 100 to the lens unit 300. A lens attached/detached state detector (not shown) detects whether the lens unit 300 is mounted on the lens mount 106 and/or connector 122. The connector 122 transfers a control signal, state signal, data signal, and the like between the camera body 100 and the lens unit 300, and also has a function of supplying currents of various voltages. The connector 122 may perform not only electrical communication but also optical communication and sound communication.

Each of the recording media 200 and 210 comprises a memory card, a hard disk or the like. The recording media 200 and 210 respectively have recording units 202 and 212 of semiconductor memory, magnetic disks or the like, the interfaces 204 and 214 for communication with the camera body 100, and the connectors 206 and 216 for connection with the camera body 100.

As the recording media 200 and 210, memory cards, such as PCMCIA cards and compact flash (CF) card, hard disks, micro DAT, magneto-optical disks, optical disks, such as CD-R and CD-WR, phase change optical disks, such as DVD, may be used.

Note that while an interchangeable lens digital SLR camera is described as the image sensing apparatus in the present embodiment, the image sensing apparatus may be a so-called digital compact camera in which the lens and the lens barrel are integrated into the body of the camera.

The operation of an image sensing apparatus having the above configuration in an embodiment of present invention is described next with reference to FIGS. 4 to 8.

Figure 4:
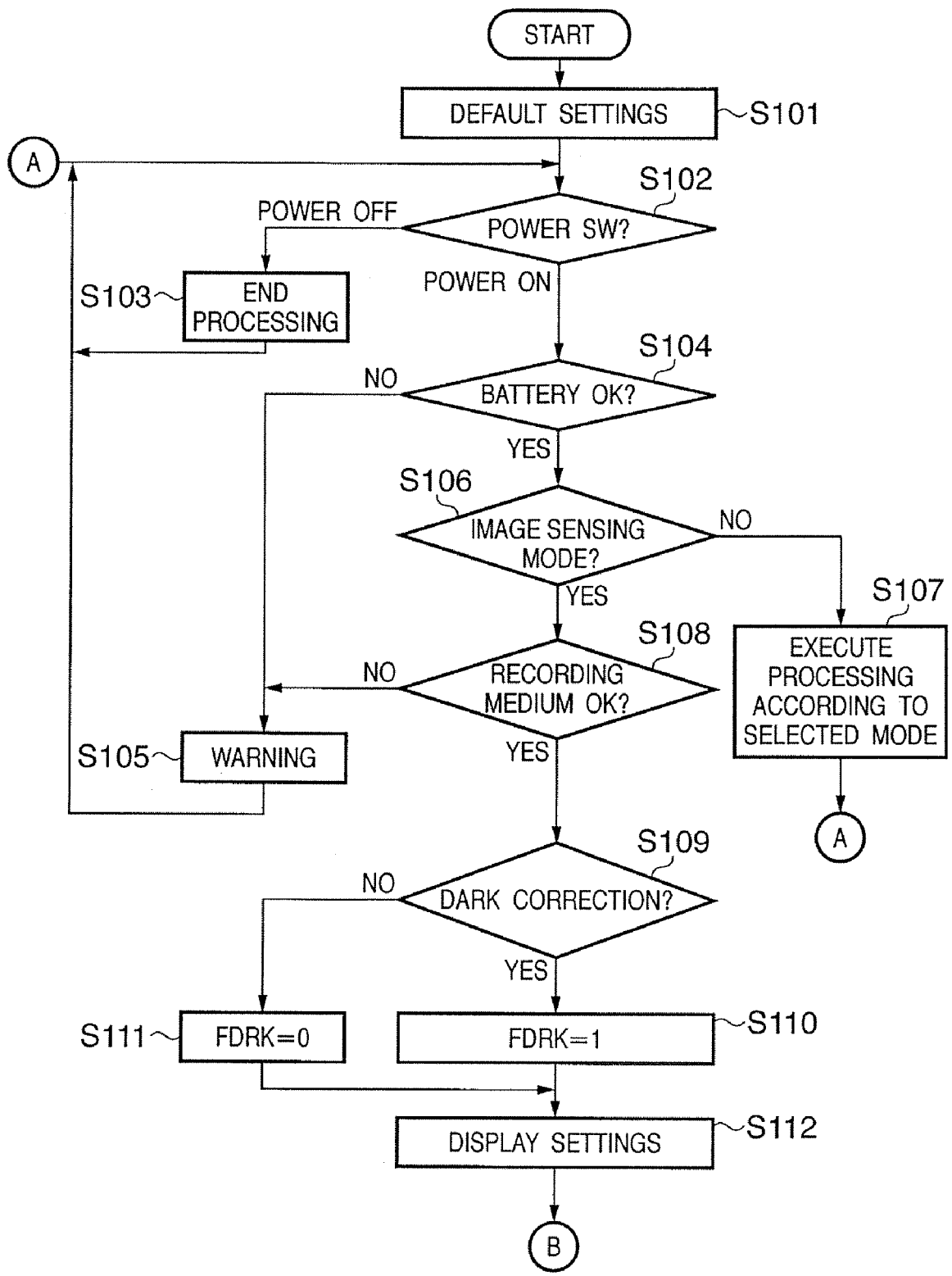
FIG. 4 is a flowchart showing an image sensing procedure of the image sensing apparatus according to the embodiment of the present invention.
Figure 5:
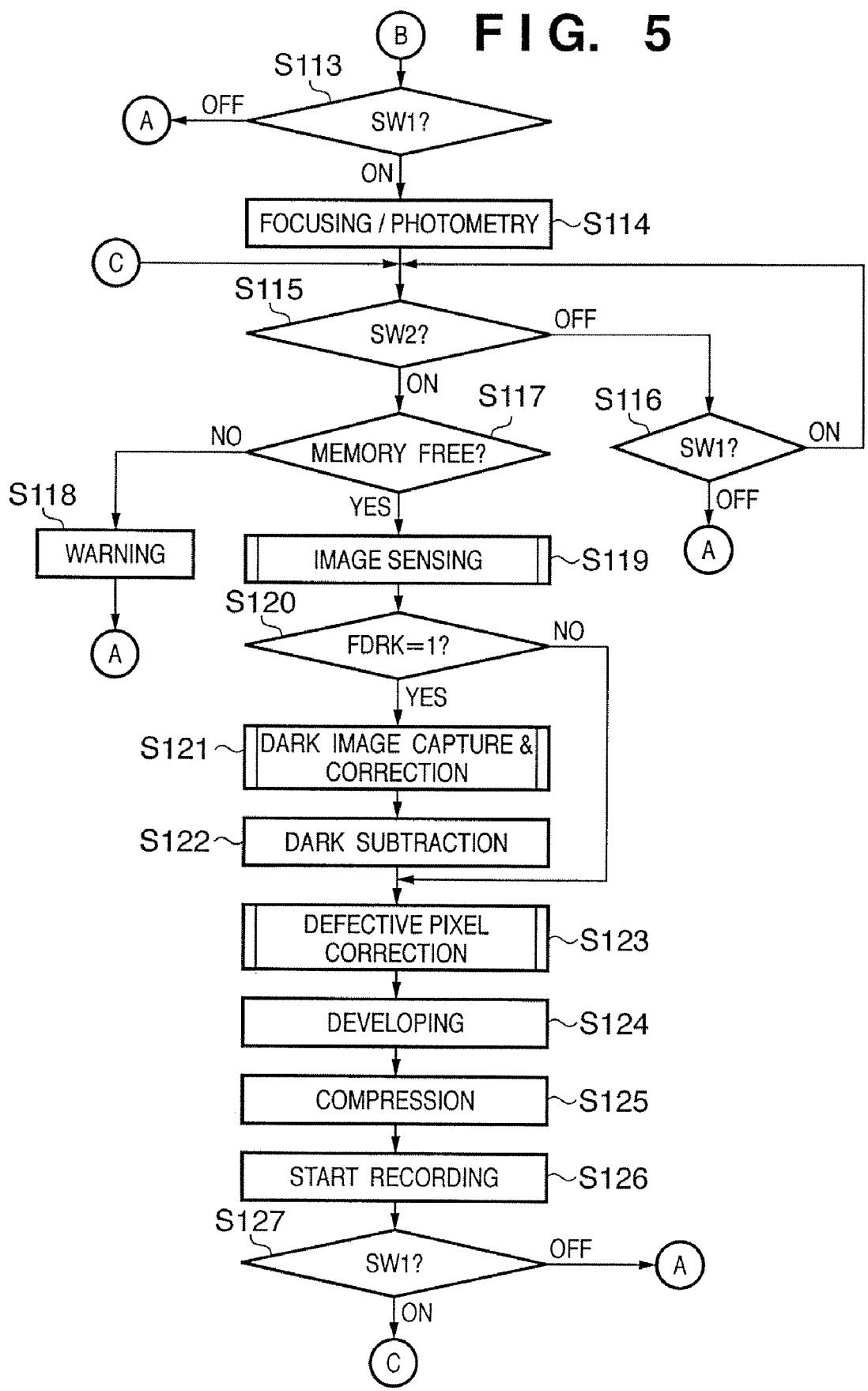
FIG. 5 is a flowchart showing an image sensing procedure of the image sensing apparatus according to the embodiment of the present invention.

FIGS. 4 and 5 are flowcharts showing the image sensing procedure of the image sensing apparatus in the present embodiment. This processing program is stored in a storage medium such as the nonvolatile memory 56, and executed by the CPU in the system controller 50 after being loaded in the memory 52.

In FIG. 4, the system controller 50 initializes flags and control variables as a result of a power-on such as a battery exchange (step S101), and sets the necessary prescribed default settings in relation to the various units of the camera body 100. Next, the system controller 50 determines the set position of the power switch 72, and determines whether the power switch 72 is set to power OFF (step S102). If the power switch 72 is set to power OFF, the system controller 50 changes the display on the display units to an end state, and records the necessary parameters and settings, including flags and control variables, and the set mode to the nonvolatile memory 56. Further, the system controller 50 performs prescribed end processing such as using the power controller 80 to block unnecessary power to the various units of the camera body 100 including the image display unit 28 (step S103), before returning to step S102.

If the power switch 72 is set to ON at step S102, the system controller 50 uses the power controller 80 to judge whether the remaining capacity or operating conditions of the power source 86, which is configured by a battery or the like cause any problem to the operation of the camera body 100. If the power source 86 has a problem (NO in step S104), the system controller 50 notifies of a prescribed warning with an image and/or audio using the notification unit 54 (step S105), before returning to step S102.

On the other hand, if there is no problem with the power source 86 (YES in step S104), the system controller 50 judges the set position of the mode dial switch 60, and determines whether the mode dial switch 60 is set to image sensing mode (step S106). If the mode dial switch 60 is set to a mode other than the image sensing mode, the system controller 50 executes processing according to the selected mode (step S107), and returns to step S102 when the processing has ended. If the mode dial switch 60 is set to image sensing mode, the processing moves to step S108.

At step S108, the system controller 50 judges whether the recording medium 200 or 210 is attached. If attached, the system controller 50 acquires the management information of image data recorded on the recording medium 200 or 210. Further, the system controller 50 determines whether the operation of the camera body 100 is being affected by the operating state of the recording medium 200 or 210, particularly with regard to recording image data to or playing image data on the recording medium 200 or 210. If it is determined that there is a problem (NO in step S108), the processing proceeds to step S105, where the system controller 50 notifies of a prescribed warning with an image and/or audio using the notification unit 54 (step S105), before returning to step S102. If it is determined that there is no problem (YES in step S108), the processing moves to step S109.

At step S109, the system controller 50 judges whether the dark subtraction mode setting button of the operation unit 70 has been set to dark subtraction mode. If it has been set, the processing moves to step S110, where the system controller 50 sets the dark image capture and correction flag FDRK for instructing that dark image capture and correction be performed to "1", before moving to step S112. If dark subtraction mode has not been set, the processing moves to step S111, where the system controller 50 sets the dark image capture and correction flag FDRK to "0", and moves to step S112. If the dark image capture and correction flag FDRK set here is "1", dark image capture and correction (described later) is performed after the image sensing.

At step S112, the system controller 50 notifies the various setting states of the camera body 100 with images and/or audio using the notification unit 54. Here, if the image display switch of the image display unit 28 is ON, the setting states of the camera body 100 may be displayed on the image display unit 28.

Next, the system controller 50 determines in step S113 whether the shutter switch SW1 (62) is depressed, and returns to step S102 if the shutter switch SW1 (62) is not depressed. If the shutter switch SW1 (62) is depressed, the processing proceeds to step S114.

At step S114, the system controller 50 performs focusing and photometry, with focusing being performed to focus the image sensing lens 310 on the subject, and photometry being performed to determine the aperture value and shutter speed. Note that the system controller 50 determines the charge accumulation period of the image sensing device 14 according to the shutter speed determined here, and performs both the image sensing and the dark image capture and correction using the determined accumulation period. The system controller 50 also sets the flash by setting the flash flag if necessary as a result of the photometry.

Once the focusing and photometry have ended, the processing proceeds to step S115, where the system controller 50 determines whether the shutter switch SW2 (64) is depressed. If the shutter switch SW2 (64) is not depressed (OFF in step S115), and the shutter switch SW1 (62) has also been released (OFF in step S116), the processing returns to step S102.

If the shutter switch SW2 (64) is depressed (step S115: ON), the system controller 50 determines whether there is an image storage buffer area capable of storing the sensed image data in the memory 30 (step S117). If it is determined that there is not an area capable of storing new image data in the image storage buffer area of the memory 30, the processing proceeds to step S118, where the system controller 50 notifies of a prescribed warning with an image and/or audio using the notification unit 54, before returning to step S102.

Note that a situation in which there is not an area capable of storing new image data in the image storage buffer area of the memory 30 may arise in the following circumstances, for example. Sometimes the first image to be read from the memory 30 and written to the storage medium 200 or 210 immediately after performing sequential image sensing up to the maximum number of shots storable in the image storage buffer area of the memory 30 has still not been completely recorded to the storage medium 200 or 210. In this case, not even one shot worth of free area can be secured in the image storage buffer area of the memory 30.

Note that if a sensed image is stored in the image storage buffer area of the memory 30 after being compressed, it is necessary to keep in mind that the compressed image data volume will vary depending on the compression mode setting, and whether or not there is storable area in the image storage buffer area of the memory 30 is judged at the processing of step S117.

If it is determined that there is storable area for a new image in the memory 30, the processing moves to step S119.

In step S119, the system controller 50 executes image sensing processing. This image sensing processing involves reading charge that has accumulated for a prescribed period from the image sensing device 14, and writing image data to a prescribed area of the memory 30 via the A/D converter 16, the image processor 20 and the memory controller 22, or directly from the A/D converter 16 via the memory controller 22. Note that the image sensing processing performed here is described in detail later with reference to FIG. 6.

Next, at step S120, the system controller 50 judges the state of the dark image capture and correction flag FDRK. If the dark image capture and correction flag FDRK is "1", the system controller 50 judges that dark image capture and correction has been set, and moves to step S121 in which dark image capture and correction is performed. If the dark image capture and correction flag FDRK is "0", the processing moves directly to step S123 without dark image capture and correction being performed.

At step S121, charge is accumulated for the same period as for the image sensing processing performed at step S119, with the shutter 21 closed.

The system controller 50 then reads the accumulated charge from the image sensing device 14, and writes the read charge as a dark image signal to a prescribed area of the memory 30 via the A/D converter 16, the image processor 20 and the memory controller 22, or directly from the A/D converter 16 via the memory controller 22. As well as temporarily storing the captured dark image signal in the memory 30, the system controller 50 sends the dark image signal to the median filtering circuit 501, where it undergoes median filtering, and then temporarily stores the processed dark image signal in the memory 30. The median filtering circuit 501, which is described in detail later, selects the median value of image signals within a preset range around the periphery of the target pixel. Consequently, the effects of defective pixels and random noise are reduced in dark image signals that have undergone median filtering (hereinafter, referred to as "corrected dark image signals" to distinguish them from dark image signals that have not been processed). Note that this dark image capture and correction is discussed in further detail later with reference to FIG. 7.

At step S122, the subtraction circuit 502 in the system controller 50 is used to subtract the corrected dark image signal from the image data taken at step S119, and the processed image data is written to a prescribed area of the memory 30.

Note that the subtraction in step S122 is performed pixel by pixel. Also, deterioration of image quality caused by the random component can be suppressed in comparison to if the captured dark image signal was subtracted directly, since the random component has been reduced in the corrected dark image signal subtracted here as a result of the median filtering. Further, since correction is realized by subtraction performed pixel by pixel, correction can reduce two-dimensional unevenness in relation to image quality degradation caused by dark current unevenness.

Next, in step S123, correction of defective pixels is performed. The correction of defective pixels performed at step S123 is discussed in detail later with reference to FIG. 8.

At step S124, the system controller 50 performs a WB integration operation and an OB (optical black) integration operation required in order to read part of the image data, stored in the prescribed area of the memory 30, via the memory controller 22 and develop the read image data. The operation result is stored in the internal memory of the system controller 50 or in the memory 52. The system controller 50 reads the sensed image data stored in the prescribed area of the memory 30, using the memory controller 22 and, if necessary, the image processor 20. Various development processing, including AWB processing, gamma conversion and color conversion, is performed using the operation result stored in the internal memory of the system controller 50 or the memory 52.

At step S125, the system controller 50 reads the image data stored in the prescribed area of the memory 30, and performs image compression according to the set mode using the compression/expansion circuit 32. The system controller 50 then writes the sensed image data that has undergone the series of processing to a free portion of the image storage buffer area of the memory 30.

In step S126, the system controller 50 reads the processed image data stored in the image storage buffer area of the memory 30. The system controller 50 then starts recording processing of writing the read image data to the recording medium 200 or 210, being a memory card, a Compact Flash (registered trademark) card or the like, via the interface 90 or 94 and the connector 92 or 96. This start-recording processing is executed on image data whenever image data that has been sensed and undergone the series of processing is newly written to a free portion of the image storage buffer area of the memory 30.

Note that during the writing of image data to the recording medium 200 or 210, the system controller 50 performs a recording medium write operation display by flashing an LED, for example, of the notification unit 54 in order to show that writing is currently in progress.

At step S127, the system controller 50 determines whether the shutter switch SW1 (62) is depressed. If the shutter switch SW1 (62) has been released, the processing returns to step S102, while if the shutter switch SW1 (62) is depressed, the processing returns to step S115, where the system controller 50 prepares for the next shot. In this manner, the system controller 50 ends this series of image sensing operations and returns to step S102.

Figure 6:
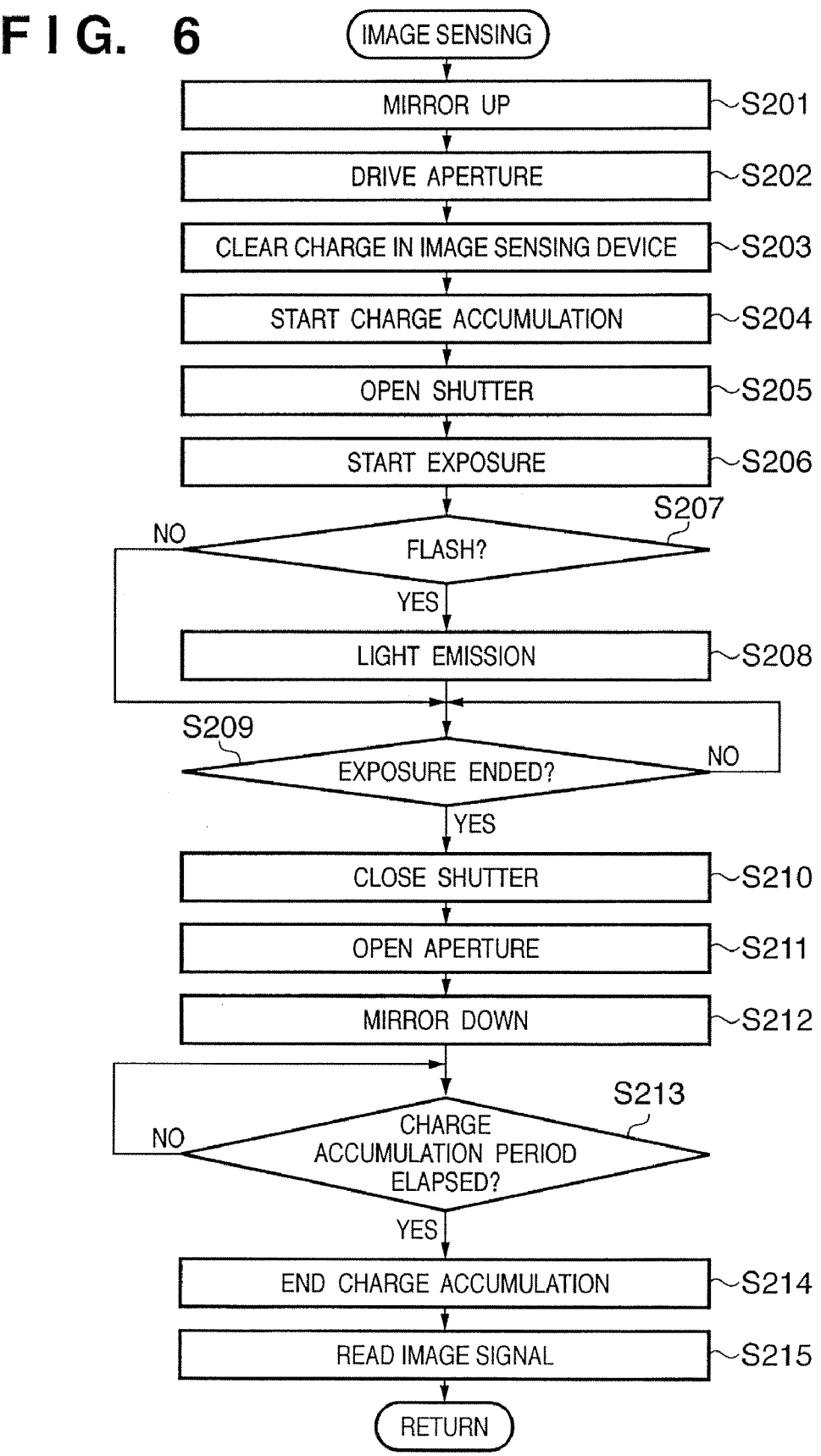
FIG. 6 is a flowchart showing the image sensing routine according to the embodiment of the present invention.

Next, the image sensing processing performed at step S119 in FIG. 5 is described with reference to the flowchart of FIG. 6.

In this image sensing processing, the exchange of various signals between the system controller 50 and the aperture controller 340 or the focus controller 342 is performed via the interface 120, the connecters 122 and 322, the interface 320, and the lens system controller 350.

Firstly, the system controller 50 uses a mirror drive unit (not shown) to move the mirror 130 to a mirror up position (step S201). Next, the aperture 312 is driven to a prescribed aperture value by the aperture controller 340, in accordance with photometric data stored in the internal memory of the system controller 50 or the memory 52 (step S202).

Next, the system controller 50 performs a charge clearance operation on the image sensing device 14 (step S203). Once the charge clearance operation of step S203 has ended, the accumulation of charge in the image sensing device 14 commences (step S204). The system controller 50 then opens the shutter 21 using the shutter controller 40 (step S205), and starts exposure of the image sensing device 14 (step S206).

In step S207, the system controller 50 checks the flash flag to determine whether light emission of the flash unit 48 is required. If required, the system controller 50 illuminates the flash unit 48 (step S208), and proceeds to step S209. If the flash flag is not set, the processing proceeds directly to step S209, where the system controller 50 waits for the exposure of the image sensing device 14 to end in accordance with the photometry data. Once the exposure has ended (YES in step S209), the processing proceeds to step S210, where the system controller 50 closes the shutter 21 using the shutter controller 40 (step S210), and ends the exposure of the image sensing device 14.

The system controller 50 then uses the aperture controller 340 to drive the aperture 312 to the maximum aperture value (step S211), and uses the mirror drive unit (not shown) to move the mirror 130 to a mirror down position (step S212).

In step S213, the system controller 50 determines whether the set charge accumulation period has elapsed. If the set charge accumulation period has elapsed (YES in step S213), the system controller 50 ends the accumulation of charge in the image sensing device 14 (step S214), and reads the charge signal from the image sensing device 14 (step S215). The read charge signal is written to a prescribed area of the memory 30 via the A/D converter 16, the image processor 20 and the memory controller 22, or directly from the A/D converter 16 via the memory controller 22.

Once this series of processing has ended, the system controller 50 ends the image sensing processing, and returns to the processing shown in FIG. 5.

The dark image capture and correction in step S121 of FIG. 5 is described next with reference to the flowchart of FIG. 7.

Firstly, the system controller 50 performs the charge clearance operation on the image sensing device 14 (step S301). Once the charge clearance operation of step S301 has ended, the accumulation of change in the image sensing device 14 commences (step S302).

At step S303, the system controller 50 determines whether a time period equal to the charge accumulation period in the image sensing processing of step S119 has elapsed. Once this charge accumulation period has elapsed (YES in step S303), the system controller 50 ends the accumulation of charge in the image sensing device 14 (step S304), and reads a charge signal from the image sensing device 14 (step S305). The read charge signal is written to a prescribed area of the memory 30 as a dark image signal, via the A/D converter 16, the image processor 20 and the memory controller 22, or directly from the A/D converter 16 via the memory controller 22 (step S306).

At step S307, the temporarily stored dark image signal is read from the memory 30, and median filtering is executed with the median filtering circuit 501 in the system controller 50. The median filtering executed here involves extracting the median value of image signals in a 5(height)×5(width) pixel range centered on the target pixel, and replacing the output value of the target pixel with the extracted median value.

For example, assume that pixel output values such as those shown in FIG. 3 are obtained, with the center coordinates (x+2, y+2) of 5 (y, y+1, . . . y+4)×5 (x, x+1, . . . x+4) pixels as the processing target. In this case, processing is performed to replace the output value 9 of the target pixel (x+2, y+2) with 3, since 3 is the median value of the 5×5 pixel range. If the target pixel is positioned at one of the four corners of the screen, preventing a 5×5 pixel range from being secured, median filtering is performed on the maximum possible range centered on the target pixel (e.g. 3×3 range). By performing median filtering for all of the pixels, dark image signals can be smoothed by removing high frequency components, thereby enabling corrected dark image signals to be obtained in which variation from peripheral pixels and spiked output values representing noise components are suppressed.

By subtracting corrected dark image signals that have undergone median filtering from sensed image data, it is possible both to suppress any increase in noise due to the subtraction, and to generate an image with reduced dark current unevenness.

At step S308, the system controller 50 writes the corrected dark image that has been median-filtered to the memory 30 for temporary storage.

Once this series of processing has ended, the system controller 50 ends the dark image capture and correction, and returns to the processing of FIG. 5.

Figure 8:
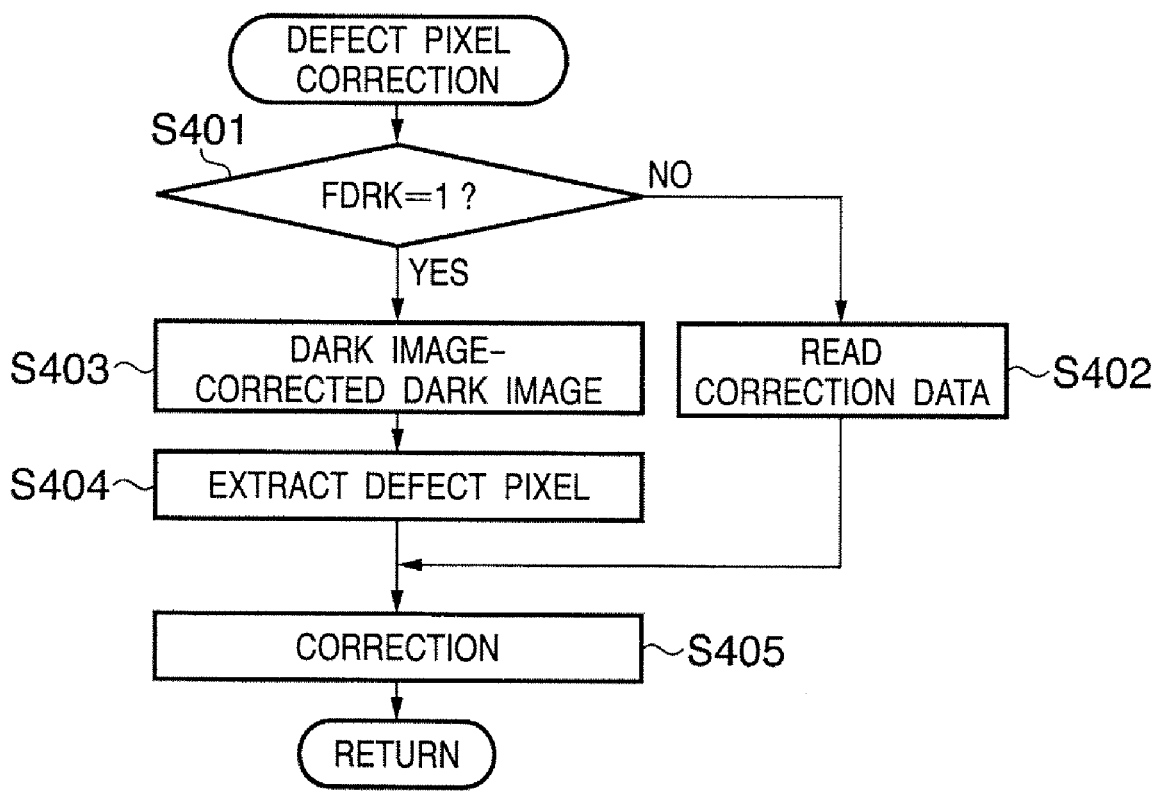
FIG. 8 is a flowchart showing a defective pixel correction routine according to the embodiment of the present invention.

The defective pixel correction performed at step S123 in FIG. 5 is described next with reference to the flowchart of FIG. 8.

At step S401, the system controller 50 judges the state of the dark image capture and correction flag FDRK, and proceeds to step S402 if the dark image capture and correction flag FDRK is "0". At step S402, the system controller 50 reads the defect correction data stored in the nonvolatile memory 56. Here, the output level of defective pixels and address data showing the coordinates (X, Y) of defective pixels are read. The processing then proceeds to step S405.

On the other hand, if the dark image capture and correction flag FDRK is "1", the processing moves to step S403 since dark image acquisition has been performed.

At step S403, the system controller 50 performs processing to suppress shading of the dark image signal. Shading occurs in sensed images and dark image signals due to the effects of the amplifier in the output portion of the image sensing device.

The detailed processing is as follows.

Figure 7:
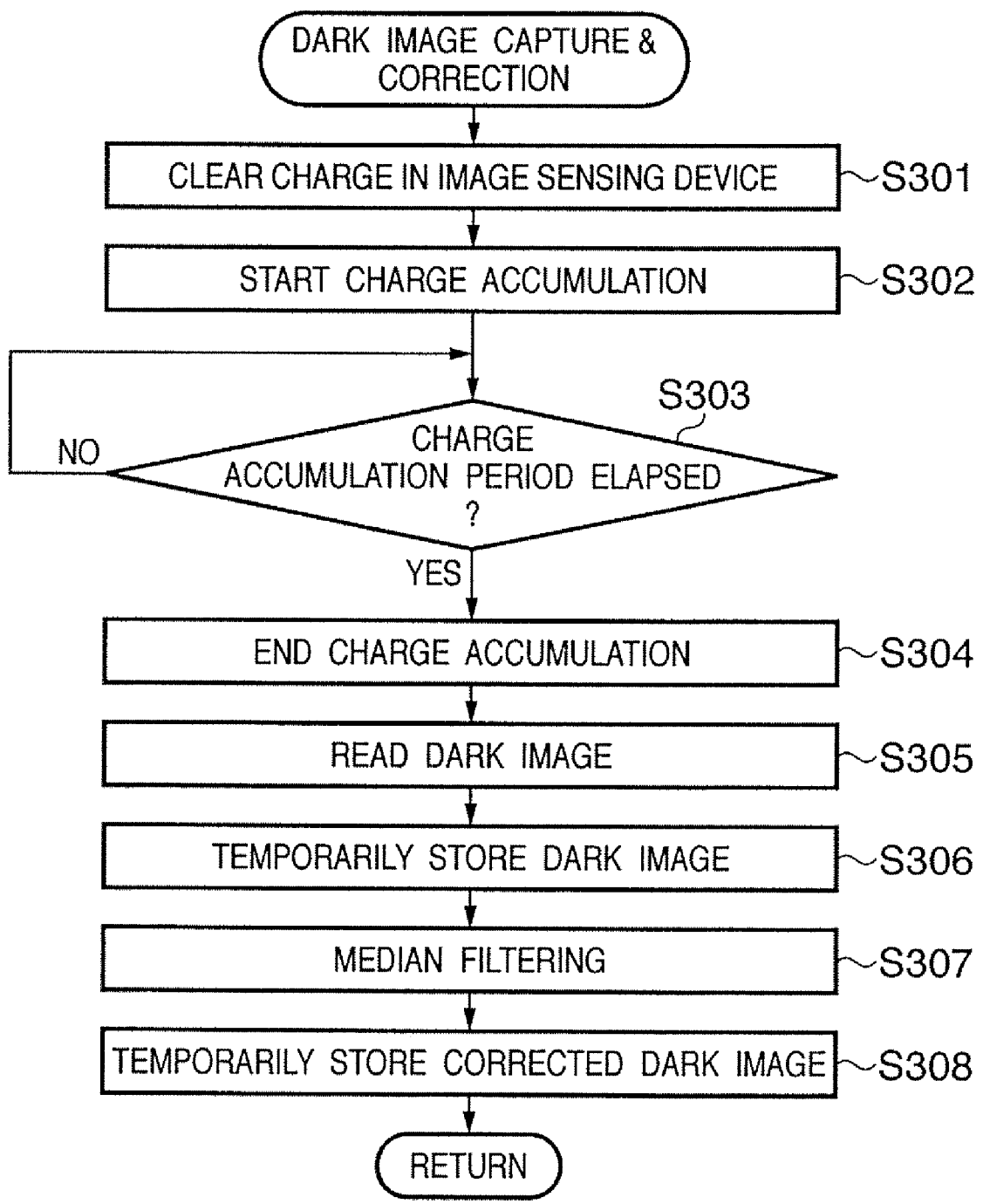
FIG. 7 is a flowchart showing a dark image capture and correction routine according to the embodiment of the present invention.

The system controller 50 reads the original dark image signal stored at step S306 in FIG. 7 and the corrected dark image signal that has been median-filtered from the memory 30. The corrected dark image signal that has been median-filtered and smoothed is then subtracted from the original dark image signal using the subtraction circuit 502 in the system controller 50.

At step S404, the system controller 50 extracts any pixel that exceeds the prescribed threshold from the subtraction result of step S403 as a defective pixel, and temporarily stores the address data of the extracted defective pixel as correction data. Thus, in the case where dark image signals are acquired, extraction of defective pixels from the acquired dark image signals is performed.

At step S405, the system controller 50 corrects the defective pixel using one of the correction data read at step S402 or the correction data extracted at step S404. In the present embodiment, a Bayer-array RGB CMOS area sensor is used as the image sensing device. For this reason, interpolation is performed based on the average value data of same color pixels nearest the defective pixel in the horizontal, vertical and diagonal directions with respect to which normal output data has been obtained.

Note that the interpolation is not limited to this. Known interpolation that uses the output levels of arbitrary peripheral pixels may naturally be employed.

Thus, if a dark image signal has been captured and correction data of a defective pixel has been newly created, correction is performed using this correction data. On the other hand, if dark image signal capture was not performed, correction is performed using the correction data read from the nonvolatile memory 56.

Once this series of processing has ended, the system controller 50 ends the defective pixel correction and returns to the processing of FIG. 5.

This defective pixel correction allows correction to be performed in relation to defective pixels that are not completely corrected using only the dark subtraction performed at step S122 in FIG. 5. Thus, by performing this processing in conjunction with dark subtraction, it is possible to reduce the effect on images caused by defective pixels and dark current unevenness, without adding new noise.

Note that in the above description, correction is described as being performed using only correction data extracted from the dark image signal in the case of dark image signal capture being performed, although the present invention is not limited to this. For example, correction may be performed with newly extracted correction data appended to the correction data stored in the nonvolatile memory 56.

Also, after the completion of defective pixel correction performed after the dark image signal capture, the dark image signal and the corrected dark image signal temporarily stored in the memory 30 may be erased.

In the above embodiment, dark image correction is performed using the median filtering circuit 501, although an averaging circuit may be used instead of the median filtering circuit 501. Correction may then be performed by subtracting a corrected dark image averaged by the averaging circuit from the sensed image. Needless to say, it is still possible in this way to generate an image in which dark current unevenness on the screen has been reduced.

In the above embodiment, dark image signal capture is performed after the main image sensing, although the present invention is not limited to this. Dark image capture may be performed immediately before the main image sensing or immediately after the power-on of the image sensing apparatus.

In the present embodiment as described above, smoothing correction is performed by median filtering and the like on a dark image signal captured around the time of the image sensing, and the corrected dark image is subtracted from the sensed image. This makes it possible to generate an image in which the localized component in relation to dark current unevenness on the screen has also been reduced, without increasing the noise component. Further, because correction is performed by extracting defective pixels using dark image signals and corrected dark image signals obtained under the same conditions as the image sensing, precise correction is possible in which the effects caused by differences in environment temperature and the accumulation period are eliminated. Performing the above two types of correction enables the effect on an image due to defective pixels and variation in the dark current component to be reduced without adding new noise, thereby making it possible to obtain a high quality image.

Note that in the above embodiment, correction data is stored in the nonvolatile memory 56, and if the dark subtraction mode setting button of the operation unit 70 is set to dark subtraction mode, controls are performed so as to execute defective pixel correction based on a dark image signal. However, the present invention is not limited to this, and may be configured so that dark image signal capture and defective pixel correction based on dark image signals are always performed, without storing correction data. In this case, correction data need not be prestored in the nonvolatile memory 56, and the dark subtraction mode setting button is also made redundant.

Alternatively, the present invention may be configured so that dark image signal capture and defective pixel correction based on dark image signals are always performed, with correction data stored in the nonvolatile memory 56. In this case, correction preferably is performed with newly extracted correction data appended to the correction data stored in the nonvolatile memory 56. The dark subtraction mode setting button is also redundant in this case.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-373521, filed on Dec. 26, 2005, which is hereby incorporated by reference herein in its entirety.

What is claimed is:

1. An image sensing apparatus comprising:
   an image sensing device that has a plurality of pixels;
   a smoothing unit that smoothes a dark image signal acquired with said image sensing device shielded from light and generates a corrected dark image signal;
   a dark correction unit that performs dark correction on an object image signal acquired by sensing an object by said image sensing device by subtracting the corrected dark image signal from the object image signal;
   an extraction unit that extracts, as a defective pixel of said image sensing device, a pixel of which an obtained difference is outside a preset range by subtracting the smoothed corrected dark image signal from the dark image signal; and
   a defective pixel correction unit that corrects an image signal output from the defective pixel using an image signal output from a pixel peripheral to the defective pixel.

2. The image sensing apparatus according to claim 1, further comprising a storage unit that stores at least pre-acquired position information of a defective pixel of said image sensing device, wherein
   said defective pixel correction unit further corrects the image signal output from the defective pixel stored in said storage unit.

3. The image sensing apparatus according to claim 1, further comprising a storage unit that stores at least pre-acquired position information of a defective pixel of said image sensing device, wherein
   said defective pixel correction unit further corrects the image signal output from the defective pixel stored in said storage unit if the dark image signal is not acquired.

4. The image sensing apparatus according to claim 3, further comprising a setting unit that sets whether to acquire the dark image signal, wherein
   the dark image signal is acquired if the dark image signal acquisition has been set by said setting unit.

5. The image sensing apparatus according to claim 1, wherein the dark image signal is acquired by accumulating charge in said image sensing device shielded from light, for a time period equal to a charge accumulation period when the subject was sensed.

6. The image sensing apparatus according to claim 1, wherein said smoothing unit performs one of median filtering processing and averaging processing.

7. A correction method for correcting an image signal output from an image sensing device that has a plurality of pixels, said method comprising:
   a image sensing step of acquiring an object image signal by sensing an object;
   a second image sensing step of acquiring a dark image signal by performing image sensing with said image sensing device shielded from light;
   a smoothing step of smoothing the dark image signal acquired in said second image sensing step and generating a corrected dark image signal;
   a dark correction step of performing dark correction on the object image signal acquired in said image sensing step by subtracting the corrected dark image signal from the object image signal;
   an extraction step of extracting, as a defective pixel of the image sensing device, a pixel of which an obtained difference is outside a preset range by subtracting the corrected dark image signal from the dark image signal; and
   a defective pixel correction step of correcting an image signal output from the extracted defective pixel using an image signal output from a pixel peripheral to the defective pixel.

8. The correction method according to claim 7, further comprising a read-out step of reading out pre-acquired position information of a defective pixel of said image sensing device stored in a storage unit,
   wherein, in said defective pixel correction step, the image signal output from the defective pixel read out in said read-out step is further corrected.

9. The correction method according to claim 7, further comprising a read-out step of reading out pre-acquired position information of a defective pixel of said image sensing device stored in a storage unit,
   wherein, in said defective pixel correction step, the image signal output from the defective pixel read out in said read-out step is further corrected if the dark image signal is not acquired.

10. The correction method according to claim 9, further comprising a setting step of setting whether to acquire the dark image signal or not,
    wherein the dark image signal is acquired by performing said second image sensing step if the dark image signal acquisition has been set in said setting step.

11. The correction method according to claim 7, wherein, in said second image sensing step, the dark image signal is acquired by accumulating charge in said image sensing device shielded from light, for a time period equal to a charge accumulation period in said image sensing step.

12. The correction method according to claim 7, wherein said second image sensing step is performed in advance of said image sensing step.

13. The correction method according to claim 7, wherein said second image sensing step is performed after said image sensing step.

14. The correction method according to claim 7, wherein, in said smoothing step, one of median filtering processing and averaging processing is performed.

* * * * *